United States Patent Office 3,159,620
Patented Dec. 1, 1964

3,159,620
PROCESS FOR THE PREPARATION OF 17α-ETHYNYL-19-NORANDROSTENE COMPOUNDS
Alberto Ercoli, Milan, and Rinaldo Gardi, Carate Brianza, Milan, Italy, assignors to Francesco Vismara S.p.A., Casatenovo, Como, Italy, a corporation of Italy
No Drawing. Filed July 12, 1963, Ser. No. 294,732
Claims priority, application Italy May 22, 1963
14 Claims. (Cl. 260—239.55)

The present invention relates to new 10-cyano-17α-ethynyl-19-norandrostenes and to a process for the synthesis of 17α-ethynyl-19-norandrostene compounds.

More particularly, this invention is concerned with the new 17α-ethynyl-10-cyano-19-nor-Δ⁵-androstene-3β,17β-diol and the corresponding 17α-ethynyl-10-cyano-19-nor-Δ⁵-androstene-17β-ol-3-one 3-alkylene ketals, with methods for their preparation and with a method for their conversion into 17α-ethynyl-19-norandrostene derivatives.

The new compounds of the present invention can be represented by the following general formula:

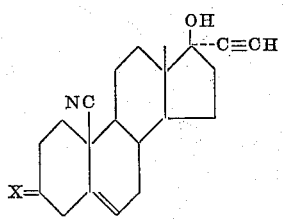

in which X represents the group

or a grouping of the structure

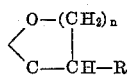

wherein R is selected from the group consisting of hydrogen and a lower alkyl radical containing up to three carbon atoms, hydrogen being preferred, and n is selected from the integers one and two.

The new compounds of this invention possess valuable physiological properties and show particularly anti-pituitary activity. In addition, these compounds are useful as intermediates for the production of 17α-ethynyl-19-norandrostene derivatives, thus opening a simple way to the synthesis of physiologically interesting 19-nor-compounds, such as 17α-ethynyl-19-nortestosterone and enolethers thereof, starting from steroid compounds of the normal series bearing a preformed ethynyl group at the 17α-position.

The processes for producing the new 10-cyano-17α-ethynyl-19-norandrostenes and the method for converting these compounds into 17α-ethynyl-19-nor-derivatives are illustrated by the sequence of formulae of the accompanying table. In said formulae, the symbol

indicates an alkylene ketal radical of the structure

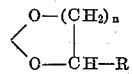

wherein R and n are as mentioned above, Ac represents an alkanoyl radical containing up to seven carbon atoms such as acetyl, propionyl, butyryl, valeryl, trimethylacetyl, benzoyl, the acetyl group being preferred, and R is a hydrocarbon radical. Preferably R represents an aliphatic hydrocarbon radical containing from one to ten carbon atoms, a cycloaliphatic hydrocarbon radical containing from four to seven carbon atoms, an arylaliphatic hydrocarbon radical containing from seven to twelve carbon atoms, or a phenyl group.

Starting material for the process of this invention is 10-cyano-19-nor-Δ⁵-androstene-3β,17β-diol (I), described and claimed in our U.S. copending application Serial No. 228,242, filed on October 4, 1962. This compound is converted into the corresponding 10-cyano-19-nor-Δ⁵-androstene-3β-ol-17-one (II) by selective oxidation with an oxidizing agent, such as chromium trioxide in acetone. The 3-hydroxy-17-keto-derivative is then treated with an alkaline acetylide, according to conventional methods of ethynylation, to give 10-cyano-17α-ethynyl-19-nor-Δ⁵-androstene-3β,17β-diol (III) This latter compound is cautiously oxidized with chromic acid in acetone to yield the corresponding Δ⁵-3-ketocompound (IVa), from which by treatment with a ketal forming agent, such as ethylene glycol, propylene glycol, butane-1,2-diol, pentane-1,2- and 1,3-diol in the presence of an acid catalyst, the new 10-cyano-17α-ethynyl-19-nor-Δ⁵-androstene - 17β - ol - 3 - one 3-alkylene ketal is obtained (V). The same compound can be prepared by subjecting to the action of the desired ketalizing agent the Δ⁴-3-ketocompound (IVb), instead of the corresponding Δ⁵-3-keto derivative as described above. The Δ⁴-3-ketocompound can be prepared in its turn, by oxidizing the diol of Formula III with cyclohexanone and aluminum isopropoxide, according to the Oppenauer's reaction.

The 10-cyano-17α-ethynyl 3-alkylene ketal of Formula V can be also obtained by an alternative route comprising the following steps: oxidation of the starting 10-cyano-19-nor-Δ⁵-androstene-3β,17β-diol (I) with cyclohexanone and aluminum isopropoxide to obtain the corresponding 10-cyano-19-nor-Δ⁴-androstene-3,17-dione (IIa); treatment of the diketo-compound (wherein the 17-keto group can be previously protected as cyanohydrin (IIb)) with an equimolecular quantity of a ketalizing agent, selected from the group consisting of ethylene glycol, propylene glycol, butane-1,2-diol, pentane-1,2- and -1,3-diol and preferably with the corresponding ketal of 2-methyl-ethyl-ketone, in order to block the 3-ketogroup as alkylene ketal; conversion of the resulting 10-cyano-19-nor-Δ⁵-androstene-17β-ol-3-one 3-alkylene ketal (IIc) into the corresponding 17α-ethynyl derivative of Formula V by treatment with an alkaline acetylide.

The 10-cyano-17α-ethynyl compounds of Formulae III and V represent suitable intermediates in the process of this invention for the preparation of the 17α-ethynyl-19-nor derivatives.

TABLE
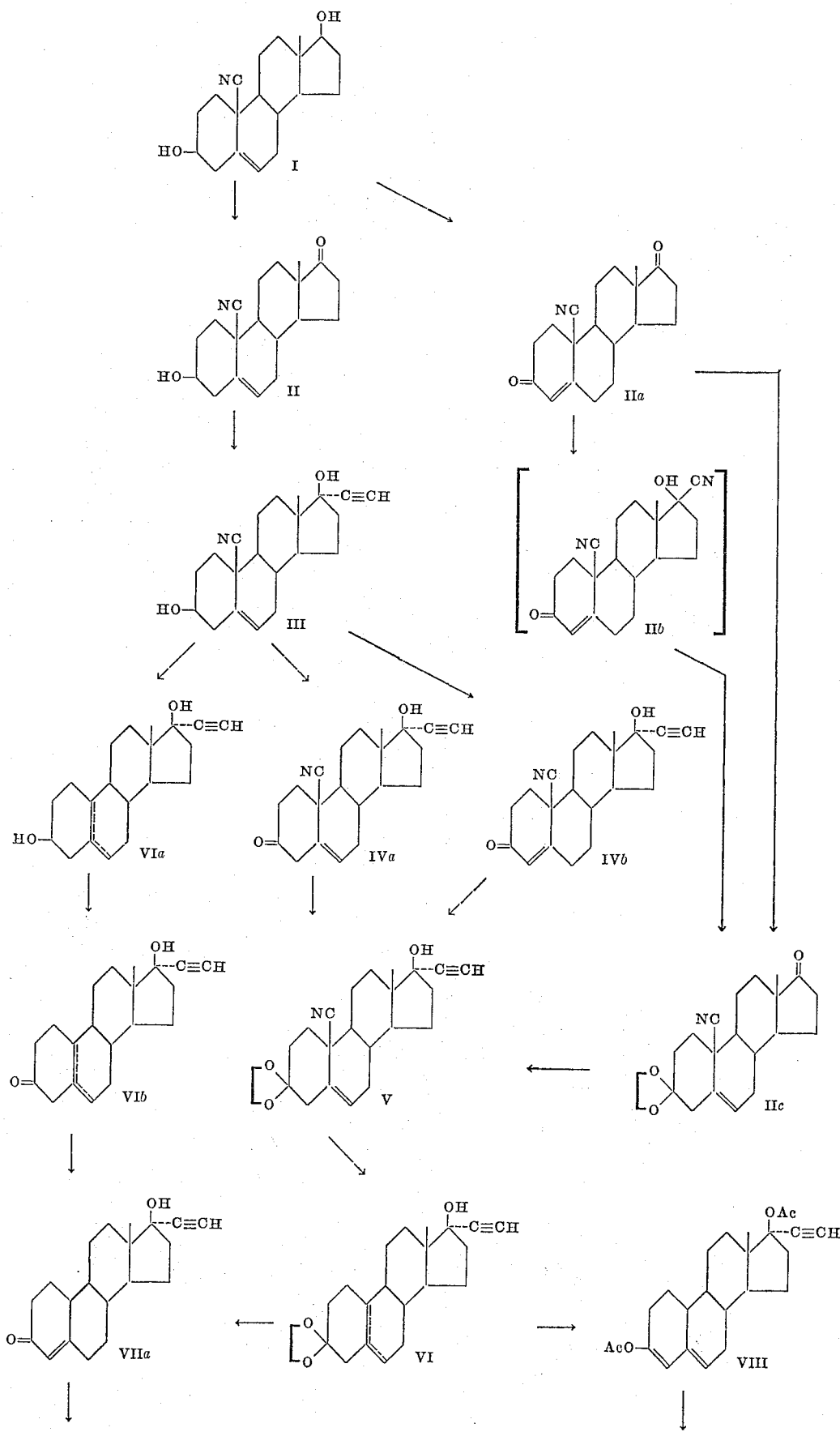

Table—Continued

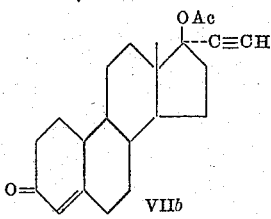

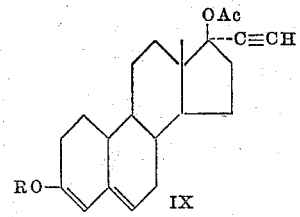

In accordance with the present invention it has been discovered that the 17α-ethynyl-10-cyano-derivatives can be converted into the corresponding 17α-ethynyl-19-nor-derivatives by reduction, the working conditions being such that only the removal of the nitril group from the 10-position and its replacement by a hydrogen atom occurs, without damage of the 17-ethynyl group, which is particularly reactive to the reducing agents. This result has been attained by submitting the 10-cyano-17α-ethynyl-derivatives of Formulae III and V to the mild reducing action of an alkali metal in ammonia or an alkali amide, in the absence of any alcohol reagent. As diluents of the reaction, non-alcoholic organic solvents are used which are inert under the reaction conditions, such as toluene, benzene, dioxane, tetrahydrofurane, ether and the like. Following this procedure, a selective denitrilation of the 10-cyano-17α-ethynyl-derivative occurs with formation of the corresponding 17α-ethynyl-19-nor-compound.

The reductive removal of the nitril group is accompanied by a partial migration of the double bond from the 5(6) position to the 5(10) position, thus obtaining a mixture of $\Delta^{5(6)}$ and $\Delta^{5(10)}$-19-nor-compounds. The mixture may be separated into its components, for example by chromatography, but preferably it is employed as such for the further transformations.

By applying the reductive denitrilation, as said above, on the compound of Formula V, a mixture is obtained of 17α-ethynyl-19-nor-$\Delta^5$-androstene-17β-ol-3-one 3-alkylene ketal and the corresponding $\Delta^{5(10)}$-isomer, both these compounds being represented by the Formula VI.

Likewise, from the diol of Formula III the corresponding $\Delta^{5(6)}$ and $\Delta^{5(10)}$-isomers of 17α-ethynyl-19-nor-androstene-3β,17β-diol (VIa) are prepared. From these latter the 17α-ethynyl-19-nor-testosterone is obtained according to conventional procedures, for example by treating the mixture of the unsaturated diols of Formula VIa with an oxidizing agent such as chromium trioxide or sodium dichromate in sulfuric or acetic acid solution, the double bonds being previously protected by addition of bromine and the halogen successively removed upon treatment with zinc and alcohol. The mixture of $\Delta^{5(6)}$ and $\Delta^{5(10)}$ isomers of 17α-ethynyl-19-nor-androstene-17β-ol-3-one of Formula VIb is then converted into 17α-ethynyl-19-nor-testosterone by simple isomerization with a mineral acid or an alkali.

Analogously, by treating the mixture of $\Delta^{5(6)}$ and $\Delta^{5(10)}$ isomers of 17α-ethynyl-19-nor-androstene-17β-ol-3-one 3-alkylene ketal (VI) with a mineral acid, a simultaneous isomerization and hydrolysis of the 3-ketal group occurs, thus obtaining 17α-ethynyl-19-nortestosterone (VIIa). By treatment with an esterifying agent, according to the usual methods of esterification, the corresponding 17-ester is prepared, such as, for example, 17α-ethynyl-19-nor-testosterone acetate (VIIb. Ac=acetyl).

The method of the present invention offers the advantage to afford, in a simple and easy manner, also the 3-enolethers of the esters of 17α-ethynyl-19-nortestosterone, which compounds are of value as progestative agents particularly because they possess increased antiovulatory properties over the corresponding parent ketone.

In accordance with the present invention, it has been further discovered that the 3-alkylene ketal isomers of Formula VI, when treated with an excess of the anhydride of an alkanoic acid containing up to seven carbon atoms, are converted into a 3-enolester of 17-ester of 17α-ethynyl-19-nortestosterone, thus attaining, by one step only, both esterification of the hydroxy group of the 17-position and enolesterification of the 3-keto group—by exchange reaction between the ketal radical and the residue of the employed acid—and simultaneous isomerization of the double bonds from the 5(6) or 5(10) position to the 3/5 positions. For example, 3, 17β-diacetoxy-17α-ethynyl-19-nor-$\Delta^{3,5}$-androstadiene (VIII, wherein Ac represents an acetyl group) is obtained by treatment with acetic anhydride.

By reacting the compound of Formula VIII with an aliphatic, cycloaliphatic or arylaliphatic alcohol of Formula ROH, wherein R has the meaning defined above, in the presence of an acid catalyst of enoletherification, an exchange reaction between the acyl radical present at the 3-position and the hydrocarbon radical of the alcohol reagent takes place and the enolethers of 17α-ethynyl-19-nortestosterone ester (IX) are obtained as end products.

Therefore the method of the present invention provides a direct conversion of the 3-alkylene ketal isomers of Formula VI into enolethers of 17α-ethynyl-19-nortestosterone esters (IX), thus avoiding the preventive step of hydrolysis of the 3-ketal to the corresponding 3-ketone which is required by the prior art methods.

The following examples are set forth as illustrating in detail the materials and methods for the preparation of the new compounds but they are not to be regarded as limiting the invention:

PREPARATION

*10-Cyano-19-Nor-$\Delta^5$-Androstene-3β,17β-Diol(I)*

A solution of 2.4 g. of the 3β,17β-diacetoxy-5α-androstane-6-one (prepared by acetylation with acetic anhydride of the corresponding 3β,17β-dihydroxy compound) in 62 cc. of tetrahydrofuran and 6.2 cc. of water is treated under stirring with 600 mg. of sodium borohydride at room temperature for 4 hours. The excess of sodium borohydride is then decomposed by the addition of dilute acetic acid, the mixture poured into ice-water and the precipitate formed is collected by filtration, washed with water and dried under vacuum, thus giving 2 g. of 3,17-diacetate of 5α-androstane-3β,6β,17β-triol. The product recrystallized from dilute methanol melts at 130–131° C.; $[\alpha]_D^{27} = -30° \pm 1$ (chl. 0.5%).

To a solution of 1.2 g. of the diacetate of 5α-androstane-3β,6β,17β-triol in 20 cc. of dry pyridine, cooled to $-5°$ C. is added dropwise with stirring 1.6 cc. of nitrosyl chloride. Stirring is continued for 4 hours and the temperature maintained at $-5°$ C.; the mixture is then poured into ice water to precipitate the 5α-androstane-3β,17β-diacetoxy-6β-yl nitrite which is collected, washed with water and dried (yield 1.1 g). After recrystallization from hexane-benzene the product melts at 152–153° C. (dec.); $[\alpha]_D^{27} = -55° \pm 1$ (chl. 0.5%).

A solution of 5.8 g. of the nitrite in 100 cc. of dry toluene in a Pyrex vessel is irradiated by means of a 200-watt mercury arc lamp for 3 hours at a temperature of about 15° C. while a stream of dry nitrogen free from oxygen is passed into the vessel. During the photolysis the solution becomes turbid because the oximino derivative, which formed, separates. The solid material is then filtered, washed with toluene, dried and recrystallized from benzene to give 3.2 g. of the nitroso-dimer corresponding to the 19-oximino-5α-androstane-3β,6β,17β-triol-3,17-diacetate melting at 162–163° C.; $[\alpha]_D^{27} = -79° \pm 1$ (chl. 0.5%).

A solution of 1.7 g. of the nitroso-dimer in 50 cc. of dry pyridine is treated, at a temperature around 0° C., by dropwise addition with 100 cc. of phosphorus oxychloride. The reaction mixture is stored at room temperature under anhydrous conditions for 20 hours, then poured into ice-water and extracted with ether. The ethereal solution is washed with dilute hydrochloric acid and an aqueous solution of sodium bicarbonate, successively, then with water and, after being dried over magnesium sulphate, is concentrated to obtain 1.3 g. of 10-cyano-19-nor-5-androstene-3β,17β-diol, diacetate. The product melts at 160–161° C. after recrystallization from methyl alcohol; $[\alpha]_D^{27} = -166° \pm 2$ (chl. 0.5%).

A solution of 1 g. of 10-cyano-19-nor-5-androstene-3β,17β-diol, diacetate in 40 cc. of ethanol is heated to reflux for 3 hours with 10 cc. of 2 N aqueous potassium hydroxide solution. After cooling, the alcohol is removed and water is added to precipitate to 10-cyano-19-nor-5-androstene-3β,17β-diol which is collected, washed with water, dried and recrystallized from ethanol. M.P. 209-210° C.; $[\alpha]_D^{25} = -174°$ (dioxane).

IR-spectrum: 3500, 2240, 1090 and 1056 cm.$^{-1}$.

EXAMPLE 1

*10-Cyano-17α-Ethynyl-19-Nor-Δ⁵-Androstene-3β,17β-Diol (III)*

To a solution of 2 g. of 10-cyano-19-nor-Δ⁵-androstene-3β,17β-diol (I) in 300 cc. of acetone, is added dropwise at room temperature and under nitrogen atmosphere, over a period of 5 minutes, 2.5 cc. of 8 N chromic acid solution (prepared treating 26, 72 g. of chromium trioxide with 23 cc. of sulfuric acid and diluting with distilled water to 100 cc.). The reaction mixture is then diluted with water and etxracted with ether. After evaporation of the solvent, the ethereal extracts give a residue which, recrystallized from methanol, provides 10-cyano-19-nor-Δ⁵-androstene-3β-ol-17-one (II), M.P. 193–195° C.

2 g. of this compound are dissolved in 40 cc. of anhydrous toluene and treated with a solution of 2 g. of potassium in 400 cc. of t. amyl alcohol. A slow stream of purified acetylene is then bubbled through the solution for 20 hours at room temperature after which the reaction mixture is poured into a mixture of ice-water containing hydrochloric acid. The organic layer is separated, washed with water, dried and evaporated to give 10-cyano-17α-ethynyl-19-nor-Δ⁵-androstene-3β,17β-diol (III).

EXAMPLE 2

*3-Cycloethylenedioxy-10-Cyano-17α-Ethynyl-19-Nor-Δ⁵-Androstene-17β-Ol (V)*

(A) To a solution of 2.3 g. of the diol II 350 cc. of acetone is added dropwise, under nitrogen atmosphere and at room temperature, 2.5 cc. of 8 N chromic acid solution, prepared as described in Example 1. At the end of the addition, the reaction mixture is stirred for an additional few minutes, always under nitrogen atmosphere, then it is poured into water and extracted with ether. The solvent is evaporated and the residue, recrystallized from methanol, gives 10-cyano-17α-ethynyl-19-nor-Δ⁵-androstene-17β-ol-3-one (IVa).

This compound (1 g.) is dissolved in 80 cc. of benzene and treated with 3 cc. of ethylene glycol and 50 mg. of p-toluenesulfonic acid. A part of the solvent is evaporated in order to remove any trace of moisture, then the mixture is heated at reflux for 6 hours, interposing a Marcusson's separator between the flask and the cooler in order to eliminate the water of the reaction. After addition of a few drops of pyridine, the solvent is completely evaporated under vacuum and the residue is taken up with methanol to give 700 mg. of 3-cycloethylenedioxy-10-cyano-17α-ethynyl-19-nor-Δ⁵-androstene-17β-ol (V).

(B) 2 g. of 10-cyano-17α-ethynyl-19-nor-Δ⁵-androstene-3β,17β-diol (III) are dissolved in 120 cc. of toluene and 24 cc. of cyclohexanone and treated with 2.4 g. of aluminum isopropoxide dissolved in 30 cc. of anhydrous toluene. The resulting mixture is heated at reflux for 3 hours, then cooled, diluted with ether and treated with dilute hydrochloric acid. The organic layer is separated, washed with water and distilled and the residue is extracted again with ether to afford 10-cyano-17α-ethynyl-19-nor-Δ⁴-androstene-17β-ol-3-one (IVb). The 10-cyano-Δ⁴-3-ketocompound is treated with ethylene glycol and p-toluenesulfonic acid in benzene solution in the same manner as described in part A of this example, and it is converted into the corresponding 10-cyano-3-ethylene ketal (V).

In similar manner, 10-cyano-17α-ethynyl-19-nor-Δ⁴-androstene-17β-ol-3-one is reacted with propylene glycol to give the corresponding 3-propylene ketal.

(C) To a solution of 2 g. of 10-cyano-19-nor-Δ⁵-androstene-3β,17β-diol (I) in 120 cc. of toluene and 25 cc. of cyclohexanone, is added 2.5 g. of aluminum isopropoxide dissolved in 50 cc. of anhydrous toluene. The mixture is heated at reflux for 3 hours distilling, from time to time, little quantities of the solvent. After adding water acidulated with hydrochloric acid, the toluic layer is separated and the mother-liquors are extracted with ether. The organic layers are collected, washed, dried and evaporated. From the residue extracted again with ether, 1.350 g. of 10-cyano-19-nor-Δ⁴-androstene 3,17-dione (IIa) is obtained, which after recrystallization from methanol melts at 183–185° C.

I g. of this product is treated with 20 cc. of 2-methyl-2-ethyl dioxolane and 30 mg. of p-toluenesulfonic acid. The reaction mixture is heated for about 5 hours, then it is neutralized with sodium carbonate and the benzene is completely evaporated under vacuum. The residue, taken up with dilute methanol, gives 3-cycloethylenedioxy-10-cyano-19-nor-5-androstene-17-one (IIc).

2 g. of this 3-monoketal, dissolved in 40 cc. of anhydrous toluene are treated with potassium t. amylate, bubbling through the mixture a stream of purified acetylene, following the same procedure as described in Example 1 for the ethynylation of 10-cyano-19-nor-Δ⁵-androstene-3β-ol-17-one (II). The 3-ethylene ketal of 10-cyano-17α-ethynyl-19-nor-testosterone (V) thus obtained is identical with the product prepared following the procedures described in parts A and B of this example.

(D) 10-cyano-19-nor-Δ⁵-androstene-3β,17β-diol (I) is converted into Δ⁴-3,17-dione (IIa) as described in part C of this example.

1 g. of 10-cyano-19-nor-Δ⁴-androstene-3,17-dione is dissolved, on gently heating, in 5 cc. of acetone cyanohydrin and the resulting solution is treated with two drops of triethylamine. After two hours the 17-cyanohydrin which separates, is dissolved in 100 cc. of benzene and treated under reflux with 3 cc. of ethylene glycol and 50 mg. of p-toluenesulfonic acid in the same manner as described for the ketalization of the compound IVa in part A of this example. The resulting 17-cyanohydrin-3-ketal is heated on boiling water bath with dilute pyridine to give the 3-monoketal IIc which is then converted into the corresponding 17α-ethynyl derivative V as referred in the part C of this example.

EXAMPLE 3

*17α - Ethynyl - 19 - Nor - Δ⁵⁽⁶⁾ - Androstene - 17β - Ol - 3-One 3-Ethylene Ketal and 17α-Ethynyl-19-Nor-Δ⁵⁽¹⁰⁾-Androstene-17β-Ol-3-One 3-Ethylene Ketal (VI)*

A solution of 10-cyano-3-monoketal (V) in 60 cc. of dry ether and 60 cc. of dry dioxane is dropped into 400 cc. of liquid ammonia. Then, 1.2 g. of lithium in small pieces are introduced over a period of 90 minutes and the mixture is maintained under stirring until the blue color of the solution is discharged.

10 g. of ammonium chloride are added and the stirring is continued for some hours longer at room temperature. The most ammonia is left to evaporate cautiously, maintaining the mixture on water-bath and diluting the resulting solution with water. After repeated extractions with ether, an oily residue is obtained consisting of a mixture of Δ5(6) and Δ5(10) isomers of 17α-ethynyl-19-nor-androstene-17β-ol-3-one 3-ethylene ketal (VI).

The same reaction may be carried out using lithium amide instead of lithium. Other alkali reagents which can be used in the above procedure are sodium or potassium metal, sodamide and potassium amide.

EXAMPLE 4

*17α - Ethynyl-19-Nor-Δ5(6)-Androstene - 3β,17β-Diol and 17α-Ethynyl-19-Nor-Δ5(10)-Androstene-3β,17β-Diol (VIa)*

By treating 17α-ethynyl-10-cyano-19-nor-Δ5-androstene-3β,17β-diol (III) in the same manner as shown in Example 3, an oily product is isolated, which consists of a mixture of Δ5(6) and Δ5(10)-isomers of 17α-ethynyl-19-norandrostene-3β,17β-diol (VIa).

EXAMPLE 5

*17α-Ethynyl-19-Nortestosterone (VIIa).*

(A) The mixture of the isomers obtained in Example 3, is dissolved in 50 cc. of methyl alcohol and treated with few drops of hydrochloric acid. The solution is heated under reflux for 15 minutes, then it is diluted with water. A product separates which recrystallized from methanol shows a melting point (203–204° C.) identical to the melting point of the pure 17α-ethynyl-19-nortestosterone obtained by other ways. By treating this compound with acetic anhydride, the 17α-ethynyl-19-nortestosterone acetate (VIIb) is obtained.

In similar manner other esters of 17α-ethynyl-19-nortestosterone are prepared, such as propionate, trimethylacetate, oenantate, valerate and the like.

(B) A solution of 500 mg. of the mixture of Δ5(6) and Δ5(10) diols isomers (VIa) in 160 cc. of acetone is oxidized with 8 N chromic mixture, according to the procedure described in Example 1 for the preparation of the 10-cyano-17-keto derivative (II); 280 mg. of a gummy residue is obtained, from which, by treatment with ether an oily product is isolated, consisting of a mixture of 17α - ethynyl-19-nor-Δ5(10)-androstene-17β-ol-3-one and 17α-ethynyl-19-nor-Δ5(6)-androstene-17β-ol-3-one (VIb).

The mixture of the two 19-nor-isomers is dissolved in methyl alcohol and treated with dilute hydrochloric acid as described in the part A of this example to give 17α-ethynyl-19-nortestosterone. The same result is obtained by employing in the above reaction potassium hydroxide solution (2 N) instead of dilute hydrochloric acid.

EXAMPLE 6

*17α-Ethynyl-19-Nortestosterone-3,17-Diacetate (VIII)*

To a solution of 1 g. of the mixture of 3-ketal-isomers of Formula VI in 10 cc. of acetic anhydride is added a solution of 700 mg. of p-toulenesulfonic acid in 7 cc. of acetic anhydride. The reaction mixture is kept at room temperature and under stirring for 5 hours. After some time a crystalline product begins to precipitate and the precipitation is complete by diluting with water. The precipitate is filtered and crystallized from methanol to give 17α-ethynyl-19-nortestosterone 3,17-diacetate (VIII), M.P. 175–178° C.

By substituting in the above reaction the acetic anhydride with the anhydride of another organic acid there is obtained other 3,17-diesters of 17α-ethynyl-19-nortestosterone, such as the dipropionate, dioenantate, divalerate and the like.

EXAMPLE 7

*3-Cyclopentyl Enolether of 17α-Ethynyl-19-Nortestosterone Acetate (IX) (R=Cyclopentyl)*

A solution of 1 g. of the diacetate (VIII) in 100 cc. of n. eptane containing 2.5 cc. of cyclopentanol and 50 mg. of p-toluenesulfonic acid is heated under reflux for 20 hours. After cooling, a few drops of pyridine are added and the solvent is eliminated by evaporation under vacuum. The residue is taken up with methanol to give 3-cyclopentyl enolether of 17α-ethynyl-19-nortestosterone acetate which, after recrystallization from methanol, melts at 182–184° C.; [α]D=—125° (dioxane).

In the same manner as above the following enolethers of 17α-ethynyl-19-nortestosterone acetate are obtained:

3-methyl-enolether of 17α-ethynyl-91-nortestosterone acetate, M.P. 183–185° C.; [α]D=—212° (dioxane);
3-n. propyl-enolether of 17α-ethynyl-19-nortestosterone acetate, M.P. 166–168° C.; [α]D=—203° (dioxane);
3-n. butyl enolether of 17α-ethynyl-19-nortestosterone acetate, M.P. 136–138° C.; [α]D=—200° (dioxane);
3-n. amyl-enolether of 17α-ethynyl-19-nortestosterone acetate, M.P. 120–121.5° C.; [α]D=—197.5° (dioxane);
3-isoamyl-enolether of 17α-ethynyl-19-nortestosterone acetate, M.P. 157–159° C.; [α]D=—194° (dioxane);
3-n. hexyl-enolether of 17α-ethynyl-19-nortestosterone acetate, oil, [α]D=—144° (dioxane);
3-cyclohexyl-enolether of 17α-ethynyl-19-nortestosterone acetate, M.P. 188–190° C.; [α]D=—198° (dioxane);
3-benzyl-enolether of 17α-ethynyl-19-nortestosterone acetate, M.P. 194–196° C.; [α]D=—185° (dioxane);
3-n. octyl-enolether of 17α-ethynyl-19-nortestosterone acetate, oil, [α]D=—125° (dioxane).

We claim:

1. In a process for preparing 17α-ethynyl-19-nor steroids the step which comprises denitrilating a 10-cyano-17α-ethynyl-19-nor-Δ5-androstene of the formula:

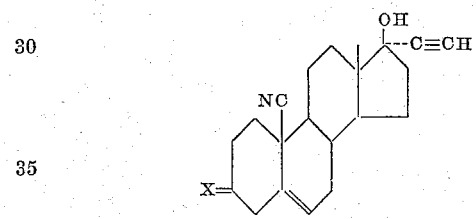

wherein X is a member selected from the group consisting of a group

and a grouping

in which R is selected from the group consisting of hydrogen and a lower alkyl radical of from 1 to 3 carbon atoms and n is selected from the integers one and two, with a reagent selected from the group consisting of an alkali metal in ammonia and an alkaliamide, in the absence of any alcohol reagent and in the presence of a non-alcoholic organic solvent to produce a mixture of Δ5(6) and Δ5(10) isomers of the corresponding 17α-ethynyl-19-nor-androstene derivative.

2. The process according to claim 1 in which the alkali metal is lithium.

3. The process according to claim 1 in which the alkaliamide is lithium amide.

4. In a process for preparing 17α-ethynyl-19-nor steroids the step which comprises denitrilating a 10-cyano-17α-ethynyl-19-nor-Δ5-androstene of the formula:

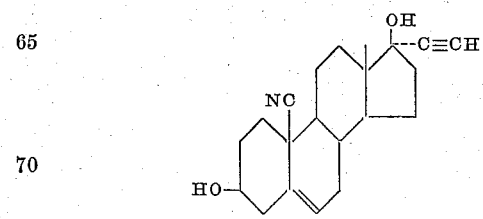

with a reagent selected from the group consisting of an alkali metal in ammonia and an alkaliamide in the absence of any alcohol reagent and in the presence of a non-alcoholic organic solvent to produce a mixture of $\Delta^{5(6)}$ and $\Delta^{5(10)}$ isomers of 17α-ethynyl-19-nor-androstene-3β,17β-diol.

5. In a process for preparing 17α-ethynyl-19-nor steroids the step which comprises denitrilating a 10-cyano-17α-ethynyl-19-nor-$\Delta^5$-androstene of the formula:

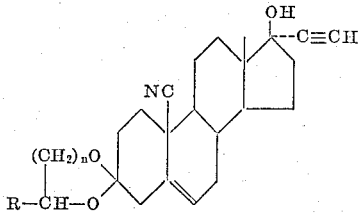

wherein R is selected from the group consisting of hydrogen and a lower alkyl radical of from 1 to 3 carbon atoms, and $n$ is selected from the integers one and two, with a reagent selected from the group consisting of an alkali metal in ammonia and an alkaliamide in the absence of any alcohol reagent and in the presence of a non-alcoholic organic solvent to produce a mixture of $\Delta^{5(6)}$ and $\Delta^{5(10)}$ isomers of 17α-ethynyl-19-nor-androstene-17β-ol-3-one 3-alkylene ketal.

6. The process according to claims 4 and 5 in which the alkali metal is lithium.

7. The process according to claims 4 and 5 in which the alkaliamide is lithium amide.

8. A process for preparing 17α-ethynyl-19-nortestosterone which comprises denitrilating the 10-cyano-17α-ethynyl - 19 - nor-$\Delta^5$-androstene-17β-ol-3-one 3-ethylene ketal with a reagent selected from the group consisting of lithium and ammonia and lithium amide in the absence of any alcohol reagent and in the presence of a non-alcoholic organic solvent to produce a mixture of $\Delta^{5(6)}$ and $\Delta^{5(10)}$ isomers of 17α-ethynyl-19-nor-androstene-17β-ol-3-one 3-ethylene ketal and treating the said mixture with a hydrolyzing agent selected from the group consisting of a dilute mineral acid and an alkali to form 17α-ethynyl-19-nor-testosterone.

9. A process for preparing 3-enolethers of 17α-ethynyl-19-nortestosterone of formula:

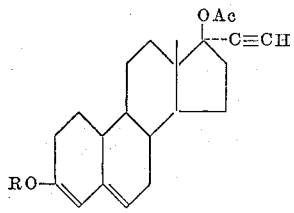

wherein R is selected from the group consisting of an aliphatic hydrocarbon radical containing from 1 to 10 carbon atoms, a cycloaliphatic hydrocarbon radical containing from 4 to 7 carbon atoms, an arylaliphatic hydrocarbon radical containing from 7 to 12 carbon atoms and a phenyl group and Ac represents an alkanoyl radical containing up to 7 carbon atoms, which comprises denitrilating the 10-cyano-17α-ethynyl-19-nor-$\Delta^5$-androstene-17β-ol-3-one 3-ethylene ketal with a reagent selected from the group consisting of lithium and ammonia and lithium amide in the absence of any alcohol reagent and in the presence of a non-alcoholic organic solvent to produce a mixture of $\Delta^{5(6)}$ and $\Delta^{5(10)}$ isomers of 17α-ethynyl-19-nor-androstene-17β-ol-3-one 3-ethylene ketal, treating the said mixture with the anhydride of an alkanoic acid containing up to 7 carbon atoms in the presence of an acid catalyst and treating the resulting 3,17β-diacyloxy-17α-ethynyl-19-nor-$\Delta^{3,5}$-androstadiene with an alcohol of formula ROH, wherein R has the same meaning as above, in the presence of an acid catalyst to form a 3-enolether of 17α-ethynyl-19-nortestosterone ester.

10. A process for preparing 3-cyclopentyl enolether of 17α-ethynyl-19-nortestosterone acetate which comprises denitrilating the 10-cyano-17α-ethynyl-19-nor-$\Delta^5$-androstene-17β-ol-3-one 3-ethylene ketal with a reagent selected from the group consisting of lithium and ammonia and lithium amide, in the absence of any alcohol reagent and in the presence of a non-alcoholic organic solvent to produce a mixture of $\Delta^{5(6)}$ and $\Delta^{5(10)}$ isomers of 17α-ethynyl-19-nor-androstene-17β-ol-3-one 3-ethylene ketal, treating the said mixture with acetic anhydride in the presence of an acid catalyst and treating the resulting 3,17β-diacetoxy-17α-ethynyl-19-nor-$\Delta^{3,5}$-androstadiene with cyclopentanol in the presence of an acid catalyst to form 3-cyclopentyl enolether of 17α-ethynyl-19-nortestosterone acetate.

11. 10-cyano-17α-ethynyl-19-nor-$\Delta^5$-androstenes of the formula:

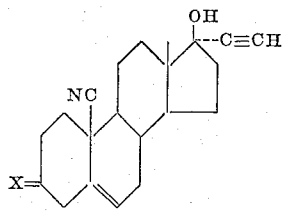

wherein X is a member selected from the group consisting of a group

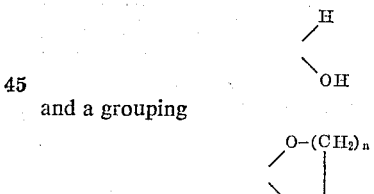

and a grouping in which R is selected from the group consisting of hydrogen and a lower alkyl radical of from 1 to 3 carbon atoms and $n$ is selected from the integers one and two.

12. 10-cyano - 17α - ethynyl-19-nor-$\Delta^5$-androstene-3β, 17β-diol.

13. 10-cyano - 17α - ethynyl-19-nor-$\Delta^5$-androstene-17β-ol-3-one 3-ethylene ketal.

14. 10-cyano - 17α - ethynyl-19-nor-$\Delta^5$-androstene-17β-ol-3-one 3-propylene ketal.

No references cited.

UNITED STATES PATENT OFFICE
CERTIFICATE OF CORRECTION

Patent No. 3,159,620            December 1, 1964

Alberto Ercoli et al.

It is hereby certified that error appears in the above numbered patent requiring correction and that the said Letters Patent should read as corrected below.

Column 6, line 14, for "of the 17-position" read -- at the 17-position --; column 7, line 6, for "100 cc." read -- 10 cc. --; line 53, for "II 350 cc." read -- III in 350 cc. --; column 10, line 5, for "17α-ethynyl-91-nortestosterone" read -- 17α-ethynyl-19-nortestosterone --.

Signed and sealed this 18th day of May 1965.

(SEAL)
Attest:

ERNEST W. SWIDER
Attesting Officer

EDWARD J. BRENNER
Commissioner of Patents